US012524465B2

(12) United States Patent
Fieldman

(10) Patent No.: US 12,524,465 B2
(45) Date of Patent: Jan. 13, 2026

(54) SYSTEMS AND METHODS FOR BROWSER EXTENSIONS AND LARGE LANGUAGE MODELS FOR INTERACTING WITH VIDEO STREAMS

(71) Applicant: CurioXR, Inc., Gainesville, FL (US)

(72) Inventor: Ethan Fieldman, Gainesville, FL (US)

(73) Assignee: CurioXR, Inc., Gainesville, FL (US)

( * ) Notice: Subject to any disclaimer, the term of this patent is extended or adjusted under 35 U.S.C. 154(b) by 0 days.

(21) Appl. No.: 18/495,269

(22) Filed: Oct. 26, 2023

(65) Prior Publication Data

US 2025/0139162 A1    May 1, 2025

(51) Int. Cl.
*G06F 16/00* (2019.01)
*G06F 16/735* (2019.01)
*G06F 16/738* (2019.01)
*G06F 16/78* (2019.01)
*G06F 16/783* (2019.01)
*G06F 40/279* (2020.01)

(52) U.S. Cl.
CPC ........ *G06F 16/7844* (2019.01); *G06F 16/735* (2019.01); *G06F 16/738* (2019.01); *G06F 16/7867* (2019.01); *G06F 40/279* (2020.01)

(58) Field of Classification Search
CPC .. G06F 16/735; G06F 16/738; G06F 16/7844; G06F 16/7867
USPC ........................................................ 707/722
See application file for complete search history.

(56) References Cited

U.S. PATENT DOCUMENTS

| 8,185,543 | B1 * | 5/2012 | Choudhry | G06F 16/738 707/767 |
| 8,838,587 | B1 * | 9/2014 | Adams | G06F 16/9535 707/731 |
| 8,990,692 | B2 * | 3/2015 | Chelba | G06F 3/0484 715/721 |
| 10,388,274 | B1 * | 8/2019 | Hoffmeister | G06N 3/044 |
| 10,902,342 | B2 * | 1/2021 | Katz | G06N 5/041 |
| 11,057,519 | B1 * | 7/2021 | Miller | H04M 3/5175 |
| 11,138,278 | B2 * | 10/2021 | Scodary | G06F 16/3347 |
| 11,194,849 | B2 * | 12/2021 | Lassoued | G06N 5/022 |
| 11,443,512 | B1 * | 9/2022 | Vesikar | G06V 20/41 |
| 11,445,244 | B1 * | 9/2022 | Jorgensen | G06F 18/22 |

(Continued)

*Primary Examiner* — Ann J Lo
*Assistant Examiner* — Rezwanul Mahmood
(74) *Attorney, Agent, or Firm* — FINNEGAN, HENDERSON, FARABOW, GARRETT & DUNNER

(57) ABSTRACT

Disclosed herein are methods, systems, and computer-readable media for prompting a machine learning model to generate answer data based on a recording. Some embodiments involve preprocessing a prompt corresponding to a query for a first system by receiving the prompt and a timestamp corresponding to a time position of the query in a recording, acquiring a text transcript based on the recording, and selecting, based on the timestamp and the text transcript, a first data domain from the text transcript. Some embodiments involve transmitting at least one of the prompt, the text transcript, and the first data domain to a second system, the second system including a machine learning model. Some embodiments involve generating answer data corresponding to the prompt by querying the machine learning model with the prompt, receiving answer data from the machine learning model, and transmitting the answer data to the first system.

24 Claims, 9 Drawing Sheets

(56) References Cited

U.S. PATENT DOCUMENTS

| | | | |
|---|---|---|---|
| 11,734,937 B1* | 8/2023 | Pushkin | G06F 18/2155 706/12 |
| 11,790,889 B2* | 10/2023 | Fernández | G06F 40/20 707/693 |
| 11,869,240 B1* | 1/2024 | Patluri | G06V 20/46 |
| 11,870,935 B1* | 1/2024 | Sekar | H04M 3/5232 |
| 12,306,878 B1* | 5/2025 | Fieldman | G06F 16/9038 |
| 12,354,500 B1* | 7/2025 | Fieldman | G06T 11/00 |
| 2008/0270110 A1* | 10/2008 | Yurick | G06F 16/61 704/3 |
| 2008/0270344 A1* | 10/2008 | Yurick | G06F 16/78 707/999.005 |
| 2010/0332225 A1* | 12/2010 | Arrowood | G10L 15/26 704/235 |
| 2013/0133048 A1* | 5/2013 | Wyn-Harris | H04L 63/102 726/5 |
| 2015/0169580 A1* | 6/2015 | Epstein | G06F 16/951 707/749 |
| 2015/0293996 A1* | 10/2015 | Liu | G06F 16/739 707/723 |
| 2017/0078767 A1* | 3/2017 | Borel | G11B 27/031 |
| 2017/0243116 A1* | 8/2017 | Takagi | G06N 20/00 |
| 2017/0270203 A1* | 9/2017 | Liu | G06F 16/73 |
| 2018/0082187 A1* | 3/2018 | Katz | G06N 5/041 |
| 2020/0074229 A1* | 3/2020 | AlShikh | G06F 40/30 |
| 2020/0082016 A1* | 3/2020 | Lassoued | G06N 5/04 |
| 2020/0227033 A1* | 7/2020 | Gustman | G06F 3/167 |
| 2020/0382517 A1* | 12/2020 | Alsina | G06F 21/629 |
| 2021/0225198 A1* | 7/2021 | Cummings | G10L 15/22 |
| 2021/0248376 A1* | 8/2021 | Zhao | G06V 20/49 |
| 2021/0289264 A1* | 9/2021 | Booth | G06F 16/735 |
| 2021/0365896 A1* | 11/2021 | Davuluri | H04L 65/4015 |
| 2021/0369042 A1* | 12/2021 | Gustman | B65D 85/8046 |
| 2022/0230194 A1* | 7/2022 | Reynolds | G06F 40/40 |
| 2022/0321970 A1* | 10/2022 | Swanson | G06V 20/46 |
| 2022/0366427 A1* | 11/2022 | Stoops | G06N 5/022 |
| 2022/0414130 A1* | 12/2022 | Master Ben-Dor | G06F 16/683 |
| 2023/0136939 A1* | 5/2023 | Kanzelberger | G06N 20/10 706/47 |
| 2023/0245654 A1* | 8/2023 | Shrivastava | G10L 15/1822 704/243 |
| 2023/0259708 A1* | 8/2023 | Pouran Ben Veyseh | G06F 40/30 704/232 |
| 2023/0259714 A1* | 8/2023 | Lange | G06F 40/237 704/9 |
| 2023/0267734 A1* | 8/2023 | Shepherd | G06V 20/41 382/100 |
| 2023/0297781 A1* | 9/2023 | Kurian | G16H 20/10 |
| 2023/0409581 A1* | 12/2023 | Betthauser | G06N 3/08 |
| 2024/0028606 A1* | 1/2024 | Chaplin | G06F 16/148 |
| 2024/0037341 A1* | 2/2024 | Kurian | G06F 40/279 |
| 2024/0119932 A1* | 4/2024 | Khorshid | G06Q 50/01 |
| 2024/0144916 A1* | 5/2024 | Britt | G10L 15/063 |
| 2024/0153493 A1* | 5/2024 | Golstein | G10L 15/02 |
| 2024/0256592 A1* | 8/2024 | O'Neill | G06F 16/483 |
| 2024/0419912 A1* | 12/2024 | Somech | G06F 40/279 |
| 2025/0139162 A1* | 5/2025 | Fieldman | G06F 16/738 |

* cited by examiner

SYSTEMS AND METHODS FOR BROWSER EXTENSIONS AND LARGE LANGUAGE MODELS FOR INTERACTING WITH VIDEO STREAMS

FIELD OF DISCLOSURE

The disclosed embodiments generally relate to systems, devices, methods, and computer readable media for transmitting and generating data from a machine learning model.

BACKGROUND

Traditional or conventional machine learning models may be capable of receiving an input and generating an output, including receiving a question as an input and producing an answer to the question as an output. For example, machine learning models may predict an answer to a text-based input question, including in the field of education, such as for answering questions a student may have to a lecture or assignment.

However, the inventors here have recognized several technical problems with such conventional systems, as explained below. Conventional systems may not include the proper background and context to generate answer data such as an answer to a student question. For example, conventional systems may provide answers that may be irrelevant to the material the student is studying, as well as generating an answer output that may be too simple or too complex for the user-which may be understood as information outside a zone of proximal development. Further, conventional systems may generate fake or spurious answer data (hallucinations) in response to a question, which may result in a student learning false information. Additionally, conventional systems may be inefficient or slow in transmitting information between a user interface and a machine learning model.

SUMMARY

Some disclosed embodiments include methods for prompting a machine learning model to generate answer data based on a recording. Some disclosed embodiments involve preprocessing a prompt corresponding to a query for a first system, the first system including a recording by receiving the prompt and a timestamp corresponding to a time position of the query in the recording, acquiring a text transcript based on the recording, and selecting, based on the timestamp and the text transcript, a first data domain from the text transcript.

Some disclosed embodiments involve transmitting at least one of the prompt, the text transcript, and the first data domain to a second system, the second system including a machine learning model trained with the first data domain. Some disclosed embodiments involve generating answer data corresponding to the prompt by querying the machine learning model with the prompt, receiving answer data from the machine learning model, and transmitting the answer data to the first system.

Some disclosed embodiments involve implementing an application in the first system, the application being configured to present a user interface at a display. Some disclosed embodiments involve interacting with a button on the user interface, wherein the interacting pauses the recording and receiving the prompt by at least one of an audio input or a text input.

Some disclosed embodiments involve selecting from the text transcript, a second data domain, transmitting the second data domain to the second system, training the machine learning model with the second data domain; and generating answer data corresponding to the prompt based on the first data domain and the second data domain. Some disclosed embodiments involve retrieving, from a database, data corresponding to a third data domain, transmitting the data corresponding the third data domain to the second system, training the machine learning model with the third data domain, and generating answer data corresponding to the prompt based on the first data domain, the second data domain, and the third data domain.

Some disclosed embodiments involve receiving a confidence metric corresponding to the answer data, determining, with the second system, whether the confidence metric satisfies a threshold, and based on a determination that the confidence metric does not satisfy the threshold, selecting a second data domain and transmitting at least a portion of the second data domain to the second system, training the machine learning model with the second data domain, and generating answer data based on the second data domain. In some disclosed embodiments, the confidence metric may be based on a user response received by the first system.

In some disclosed embodiments, the machine learning model comprises a large language model trained with an internet dataset. In some disclosed embodiments, the recording may be associated with a prerecorded video lecture. In some disclosed embodiments, the answer data may be presented at the display. In some disclosed embodiments, the answer data may be presented by an audio output device.

Other systems, methods, and computer-readable media are also discussed herein. Disclosed embodiments may include any of the above aspects alone or in combination with one or more aspects, whether implemented as a method, by at least one processor, and/or stored as executable instructions on non-transitory computer readable media.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Figure 1:
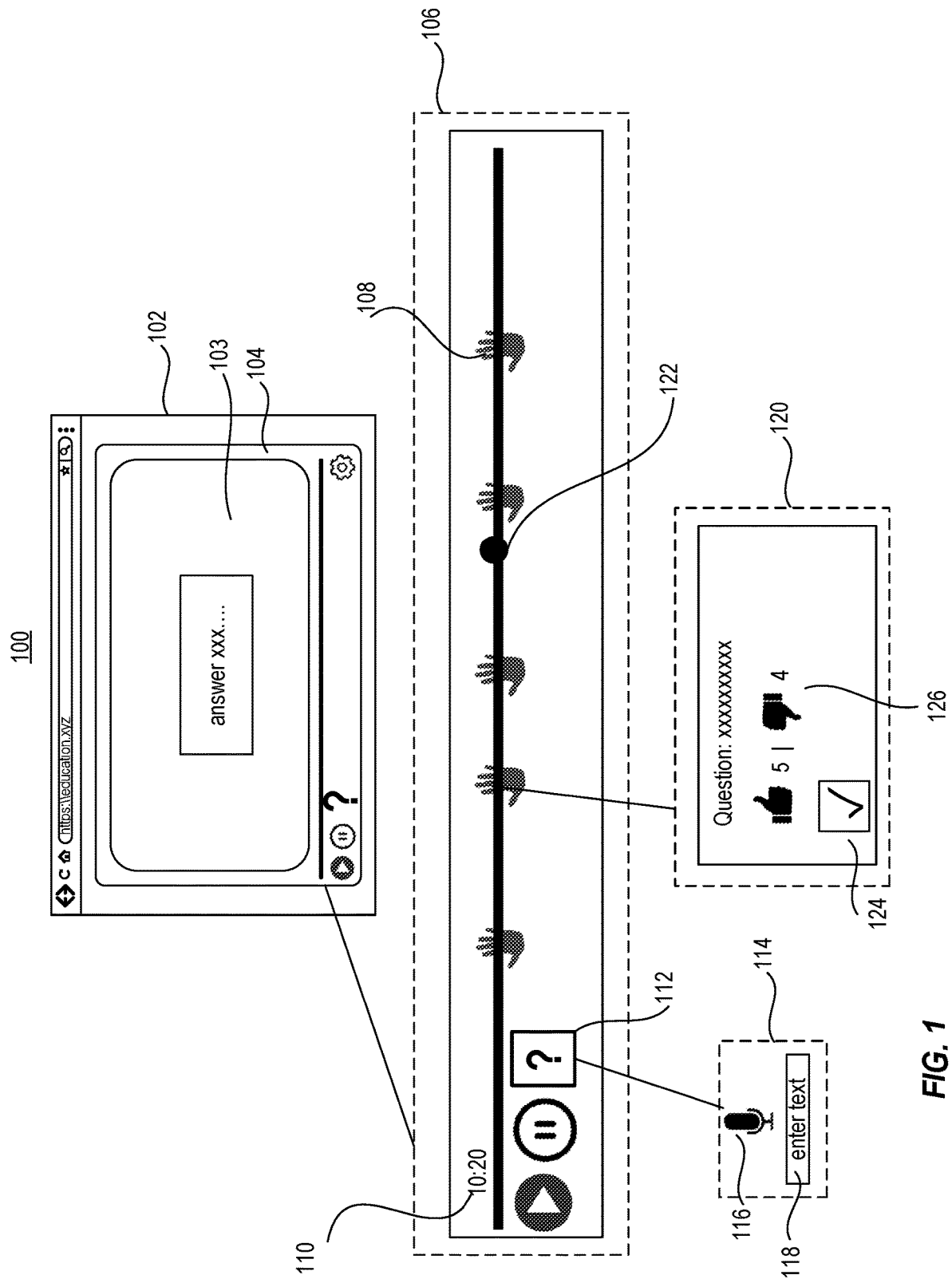
FIG. 1 is an illustration of a browser extension, consistent with embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof can occur or be performed (e.g., executed) simultaneously, at the same point in time, or concurrently. Reference will now be made in detail to the disclosed embodiments, examples of which are illustrated in the accompanying drawings.

It is to be understood that both the foregoing general description and the following detailed description are exemplary and explanatory only and are not restrictive of this disclosure. The accompanying drawings, which are incorporated in and constitute a part of this specification, illustrate several exemplary embodiments and together with the description, serve to outline principles of the exemplary embodiments.

This disclosure may be described in the general context of customized hardware capable of executing customized preloaded instructions such as, e.g., computer-executable instructions for performing program modules. Program modules may include one or more of routines, programs, objects, variables, commands, scripts, functions, applications, components, data structures, and so forth, which may perform particular tasks or implement particular abstract data types. The disclosed embodiments may also be practiced in distributed computing environments where tasks are performed by remote processing devices that are linked through a communications network. In a distributed computing environment, program modules may be located in local and/or remote computer storage media including memory storage devices.

Disclosed embodiments may provide improvements to generating output data with machine learning models, including generating answers to questions asked to a machine learning model. Disclosed embodiments enable speed, efficiency, and storage-use improvements for transferring data at different hierarchical levels to a machine learning model in order to generate answers to a question. Disclosed embodiments also enable improved relevancy and accuracy of outputs generated for answering a question, including providing more relevant answer data to a question and reducing the amount of fake, false, or spurious data.

It will be recognized that communication with machine learning models can be optimized in order to receive accurate or ideal output information or data from a machine learning model. Inputs to generative artificial intelligence models, including large language models, can be structured or designed to guide the behavior and/or output of a model. For example, an input can provide relevant context or styles to a machine learning model, and the machine learning model may temporarily learn from the structure of the input to provide an optimal response, such as a desired response to a user query. Inputs to the machine learning model can be presented or phrased such that they may cause the machine learning model to generate an output that is confined to a specific domain, such as a domain or context that a user finds useful. For example, for a query to a machine learning model regarding mice, a prompt may include a modifier to limit the output to computer mice (e.g., as opposed to mammalian mice).

Disclosed embodiments may involve prompting a machine learning model to generate answer data based on a recording. Prompting may refer to instantiating a request to a machine learning model (e.g., generating and/or providing input data to the machine learning model), including transmitting a request to a machine learning model. In some examples, prompting a machine learning model may involve providing data to the machine learning model in order to receive an output from the machine learning model. Prompting may also refer to queries sent to a machine learning model to generate information corresponding to or based on the query. For example, a query may include a user command such as a question asked by a user. A prompt may include a natural language input, including text and/or voice commands (e.g., text inputted by a user or voice to text recognition). The generated answer data may include the output of a machine learning model to a prompt or query. Answer data may refer to information and/or data generated by the machine learning model. The answer data may refer to the generated output corresponding to the input to the machine learning model, such as an answer based on an input such as a question. For example, a user may ask a question to the machine learning model, and the machine learning model may return information which can be an answer to the question.

A recording may refer to any recorded or saved media, such any combination of audio, images, video, or text. Recordings may refer to videos, including media with audio and/or visual components. For example, recordings may include media playback, such as a stream of a video including audio. Recordings may be viewed, played, or displayed on any suitable device including computers, tablets, mobile phones, or the like. In some examples, recordings may be implemented in a video playback application or a browser, such as a browser application or a video hosting site.

Some disclosed embodiments involve preprocessing a prompt corresponding to a query for a first system. Preprocessing may refer to any preparation of data for presentation to a machine learning model. In some embodiments, preprocessing may involve obtaining data, such as input data as well as any adjustments and/or manipulations of input data to a machine learning model. Some embodiments involve a prompt corresponding to a query for a first system. In an example, the prompt may be a question, such as a question asked by a user. Preprocessing may also involve standardization of data. Queries, such as questions, may be directed to a first system. A system may refer to any computerized system, including a computer, tablet, mobile phone, or the like. For example, a system may involve a browser or application on a smartphone. In another example, a system may involve a machine learning model connected to a network or a database. In some embodiments, a system may include a recording. For example, a system may display a recording or provide a recording through a user interface. In some examples, a system may include a website or application for video sharing, such as any public or private video hosting website.

FIG. 1 illustrates an exemplary embodiment of a system for interacting with a recording, consistent with embodiments of the present disclosure. System 100 may include any application or website, such as website 102. Website 102 may have a display 104 for a recording 103, and website 102 may be any website for displaying or hosting videos such as recording 103. Recording 103 may include audio and/or video media, such as voice recordings, video streams, or presentations. Timestamp 110, which may refer to an indication of time for a digital signal or file, may indicate a moment 122 in time corresponding to recording 103. In an example, timestamp may be a value relative to a starting and/or ending point of recording 103. Timestamp 110 can also include a link to a recording frame or specific moment of recording 103. In some embodiments, system 102 may determine timestamp 110 based on one or more user inputs. For example, a user may perform an interaction (e.g., movement, click, click-and-drag, hold, spoken word) in an extended reality environment, which may be detected by a device, which may generate data in response (e.g., generate a timestamp 110 based on the interaction, based on the timing of the interaction, based on content of the interaction). In some embodiments, timestamp 110 may correspond to a time position of a query in recording 103. For example, timestamp 110 may indicate the time a question is asked about information presented in recording 103. Timestamp 110 may be associated with any range of time, such as one second, 10 seconds, a minute, or an hour.

Some disclosed embodiments may involve receiving the prompt. Receiving a prompt may include at least one of retrieving, requesting, receiving, acquiring, or obtaining an input description. For example, a processor may be configured to receive a text description that has been inputted into a machine (e.g., by a user) or access a text description corresponding to a request. In an example, the prompt may be a question regarding information in recording 103. Some disclosed embodiments involve implementing an application in a first system, such as system 100. An application may include a computer program for executing certain tasks. As non-limiting examples, an application may include one or more of a software module, program, plug-in, script, web browser extension, or the like. For example, system 100 may include application 106, which can be any application configured to operate alongside or based on website 102. In some embodiments, application 106 may be configured to present a user interface at a display, such as display 104. Application 106 may present a user interface (e.g., a graphical user interface) including one or more toggles or controls which a user can interact with or operate. In some embodiments, a prompt may be received based on (e.g., in response to, derived from, dependent upon) interactions with the user interface. For example, a prompt may be received based on an interaction with a button, control, icon, or toggle, such as button 112. An interaction with button 112 may include gestures such as hovers, clicks, long presses, or the like, and interactions may be executed by a user in some examples. For example, when a user has a question about information in recording 103, the user may interact with system 100 by pressing button 112. In some embodiments, the interaction may pause the recording. For example, clicking button 112 (e.g., with a mouse) may pause recording 103 and obtain a prompt via input engine 114. Receiving the prompt may include at least one of an audio input or a text input. For example, upon pausing the recording with button 112, system 100 may present input engine 114 to a user so the user can enter a prompt via text, such as through keyboard 118, and/or through voice, such as through microphone 116. In some examples, interacting with button 112 may pause the recording 103 and await a received prompt from microphone 116 (such as a spoken question from a user), or await a prompt from keyboard 118 (such as a typed question from a user), according to a user or system preference. For example, an interaction with button 112 may simultaneously cause system 100 to pause recording 103 and accept a query (e.g., based on user input, received from a user).

It will be recognized that recordings as described herein may include a corresponding text transcript. A text transcript may refer to a text-based copy of natural language, such as a written, typed, or printed version of language in a recording. Some disclosed embodiments involve acquiring a text transcript based on a recording. Transcripts may refer to a transcription of an audio recording and/or a video recording, such as a reproduction of words spoken in a video (e.g., recording 103). Acquiring a text transcript may refer to generating, transmitting, obtaining, and/or receiving a transcription. For example, system 100 may receive a text transcript of recording 103. In an example, the transcript may be already generated, such as a transcript of recording 103 stored in a database which system 100 may be able to access, or a transcript available (e.g., displayed, presented, and/or stored) on website 102.

In some embodiments, system 100 may present a generated answer. For example, a generated answer may be presented via display 104, such as by displaying text on display 104 corresponding to the generated answer and/or presenting audio by an audio output device (e.g., a sound card, speaker, headphones, or the like). In some examples, application 106 may include an indicator 108 for a received prompt. For example, indicator 108 may be any signal or symbol identifying a question asked during a recording. Indicators 108 may be included in application 106 across different devices, such that indicator 108 can be presented to different users of different devices. As such, it will be appreciated that users may be able to view when other users may have asked questions during recording 103. Application 106 may also include a feedback module 120, which may represent any interface for communicating feedback (e.g., with a user). For example, feedback module 120 may include feedback 126 for a generated answer, such as indicators that a generated answer may be helpful (e.g., relevant to a prompt question or answers the prompt question) or unhelpful (e.g., not relevant to the prompt question or not sufficiently answering the prompt question). Feedback module 120 may also include verification indicator 124, which may represent any indication that an educator (such as a teacher or a tutor) has verified the answer generated to the corresponding question.

Figure 2:
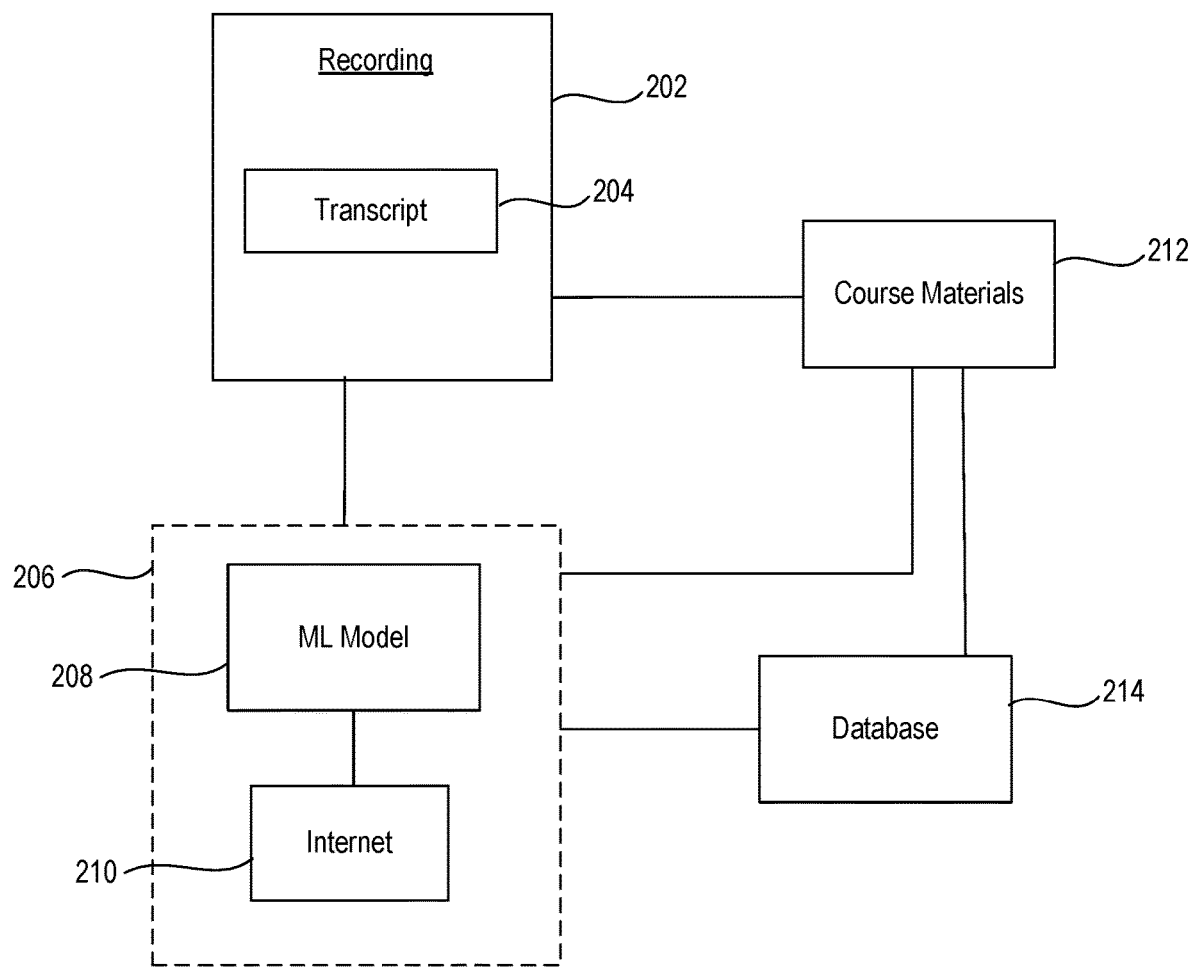
FIG. 2 is a block diagram of a machine learning model, consistent with embodiments of the present disclosure.

FIG. 2 illustrates a block diagram of a system for prompting a machine learning model to generate answer data, consistent with embodiments of the present disclosure. System 200 may include one or more systems, such as one or more subsystems. System 200 may include a recording 202 having a transcript 204, which can be preloaded (e.g., already existing, not based on user input) to system 200. In an example, recording 202 may be a video displayed on display 104 (as referenced in FIG. 1). System 200 may acquire transcript 204 corresponding to recording 202 by obtaining a transcript of the entire recording 202. In an example, acquiring transcript 204 may also involve acquiring a transcript of a portion of recording 202, such as a transcript of a specific section of time frame of recording 202. In some examples, transcript 204 may not be initially available to system 200. As such, acquiring transcript 204 may involve generating a text transcript based on recording 202. For example, the text transcript corresponding to the entire recording 202 may be generated by a transcription program, such as an audio-to-text machine learning model. In another example, the text transcript corresponding to a specific time frame, such as a time frame surrounding a timestamp, can be generated, thereby providing a partial transcript to system 200.

In some embodiments, recording 202 may correspond to a prerecorded media, such as a video lecture. Prerecorded media may refer to any media which have been filmed or recorded prior to upload or presentation, such as a recording which has been recorded in advance of being displayed on a media viewing platform. Prerecorded video lectures may include any prerecorded video for educational or informational purposes. In some examples, video lectures may include information corresponding to formal education, such as education taught in schools or colleges.

In some embodiments, a machine learning model may generate answer data, as described herein. For example, system 200 may include second system 206 having a machine learning model 208 which may generate answer data. System 200 may be a subsystem or a system which can be different than an interface for receiving prompts, such as system 100 as referenced in FIG. 1. System 200 may include machine learning model 208. In some embodiments, system 100 may communicate with system 200 by any method, including communications over a network. In some examples, application 106 may transmit any information (including prompts and/or transcripts) to system 200, such as by application programming interface (API) calls or requests. For example, application 106 may instantiate a request to an API associated with system 200 (e.g., an API having access to a machine learning model such as machine learning model 208 and corresponding data) and receive data from the API in response to the request. In some embodiments, the machine learning model may be configured and/or stored such that certain devices (e.g., user devices) may only be able to access the machine learning model through the API. For example, the text transcript of recording 103 and a question asked about recording 103 can be sent to a server as a request to an API for the machine learning model. In some embodiments, machine learning model 208 may comprise any machine learning model, including one or more of classifiers, neural networks, regression models, clustering models, a transformer model, encoder-decoder models, or the like, as non-limiting examples. Machine learning model 208 may comprise a model configured for generative artificial intelligence, including generative models such as transformers, generative adversarial networks, autoregressive models, diffusion models, and/or autoencoders. In some embodiments, machine learning model 208 may comprise a large language model trained with an internet dataset, such as a dataset stored on internet 210. A large language model may refer to a deep learning model capable of understanding and generating text, such as models which can generate a prediction of the next word in a phrase or sentence. Large language models may include one or more transformer models (or one or more encoders and/or decoders) and can be trained on large datasets and may therefore include a large number of parameters (e.g., millions, billions, or more parameters). A large language model (LLM) may be trained on one or more internet datasets, which may be datasets stored on the internet. For example, LLMs may be trained on private or publicly accessible datasets including information from books, articles, programming code, websites, or other text sources. It will be appreciated that transmitting and synthesizing data between disparate systems, which implements a solution rooted in computer technology rather than simply following rules, contributes to solving the complex problem of providing data to machine learning models. For example, transmitting queries to a machine learning model, as described herein, may enable faster, more efficient generation of answer data.

It will be recognized that machine learning model 208 may be improved by providing additional training. For example, it will be appreciated that for generating answer data based on a recording, providing training data specific to information corresponding to the recording or sources of similar information may increase the relevancy or accuracy of the generated answer data. In some examples, machine learning model 208 may be trained with recording 202. For example, transcript 204 of recording 202 may be provided to machine learning model 208 for training. In an example where recording 202 corresponds to a lecture for a course or class, machine learning model 208 may be trained with data from other materials for the course or class. For example, machine learning model 208 may be trained with course materials 212, which can include other lectures, assignments, or textbooks for the course. Machine learning model 208 may also be trained with data from database 214.

Figure 3:
FIG. 3 is an illustration of data domains, consistent with embodiments of the present disclosure.

Some disclosed embodiments involve selecting, based on the timestamp and the text transcript, a first data domain from the text transcript. A data domain may refer to a specific sphere of data, such a specific realm, scope, or region of data. A data domain may include a grouping or categorization of data. For example, a data domain may be a portion of data from a data source. FIG. 3 illustrates a diagram of data domains, consistent with embodiments of the present disclosure. In some examples, a data domain may include one or more other data domains, such as where broader data domains capture or encompass narrower data domains and include the information corresponding to narrower data domains. For example, fifth data domain 310 may include fourth data domain 308, which may include third data domain 306, which may include second data domain 304, which may include first data domain 302, where first data domain 302 may have the smallest scope of data. Data domains may refer to knowledge domains, including a realm of knowledge available or accessible (e.g., to a system or a machine learning model).

Data domains, as described herein, may refer to different levels, types, or amounts of data captured from a transcript, such as a transcript of a recording. For example, first data domain 302 may correspond to information within a certain time frame of a recording, such as the minutes surrounding a timepoint in the recording. For example, first domain 302 may include information in a video before and/or after one minute, two minutes, three minutes, four minutes, or five minutes from a timepoint such as the initiation timepoint of a query or prompt. Thereby, first domain 302 may include text in the corresponding transcript of the recording, such that first domain 302 may include text from the transcript within the surrounding minutes (e.g., the phrases or sentences in the minutes surrounding the timepoint of a query). In an example, first domain 302 may include data in any partial timeframe of the recording, including information before and/or after the timepoint. Second domain 304 may include data in the entire recording, such as any information included in or associated with a video lecture (e.g., information linked to a lesson or module associated with the transcript), and therefore information anywhere in the transcript of the video lecture. In some examples, third domain 306 may include information outside of the recording and the corresponding transcript. For example, third domain 306 may include information stored in similar recordings or resources, such as videos in a shared playlist or sharing a similar subject matter (e.g., educational topic) to the recording of the first and second domain, as well as information included in second domain 304 and first domain 302. Fourth domain 306 may include any formal educational recordings stored in a shared database or accessible over a same network as the recording of the first and second domain, as well as information included in the third domain 306. Fifth domain 308 may include any data available on the internet, as well as data included in fourth domain 306. In some embodiments, one of the domains may include user profile information, such as educational traits of a user (e.g., age, reading level, math level, topic level, first language, and/or any indication of a learning disability).

Some disclosed embodiments involve selecting (e.g., by system 100), based on the timestamp (e.g., timestamp 110) and the text transcript, a first data domain from the text transcript. Selecting a data domain may include identifying or determining a data domain, such as choosing a data domain from among a plurality of data domains. In some examples, selecting a first data domain may include determining a portion of the text transcript of a recording. The first domain may be selected based on the timestamp, such as a time frame before or after the timestamp, including the surrounding time before and after the timestamp, or the timestamp itself. The first domain may also be selected based on text of a portion of the text transcript that is associated with (e.g., corresponds to) the timestamp. For example, one or more words in the portion may be analyzed by an LLM to determine the first domain (e.g., relevant data to include in the first domain). Similarly, selecting a second domain may refer to choosing the entire transcript. In some examples, system 100 may guide the selection of the transcript data provided to the machine learning models. For example, system 100 may be configured to instruct the model to focus (e.g., during training or when being operated to produce predictive output) on a specific portion of the transcript, and may consider instructions provided by a user (e.g., a user may interact with system 100 such as through a slider or toggle to indicate relevant portions of the transcript or to indicate whether the model should weigh additional domains). By accurately and intelligently selecting a data domain, system 100 maximizes relevant information and minimizes irrelevant information for analysis and/or providing to a user, reducing strain on processing resources and bandwidth. For example, by selecting a data domain, system 100 can provide helpful context and/or background information to an LLM, while reducing strains on storage and/or memory by not providing information in the transcript which may not be relevant to a given prompt. In some embodiments, machine learning models as described herein may learn to apply different weights to data in a transcript for generation of answer data. For example, system 100 may provide the transcript to a machine learning model, and the machine learning model may be configured to weight the information in the transcript differently depending on the position of the information relative to the time a query was prompted. As an example, information in the transcript five minutes or two minutes before the timestamp of the question may be weighted more heavily than information asked ten minutes before the timestamp of the question. The entire transcript may provide context to the machine learning model, and the model may apply a larger weight the five minutes or two minutes before the timestamp, and place the larger weight on the information in a short time frame, such as the information just before the timestamp of the question prompt (e.g., 30 seconds before, the most relevant data to answering the question). The model may be instructed or may learn to place such weighting during inference, such as when the model may be executed or called upon to generate a predictive output (e.g., the output of the model such as the generation of the answer data).

It will be appreciated that the selection and weighing of information used by the machine learning model to generate answer data as described herein may reduce machine learning model hallucination, leading to improved model outputs relative to existing techniques. For example, by starting with model input data from a first data domain (e.g., information in the transcript itself) and incrementally extracting data from one or more additional domains, the model may be trained on answer data which may be more accurate to the context (e.g., because the information is in the transcript) and only use additional information as necessary (e.g., as information in the internet may be unverified), which also prevents wasting computing resources on unnecessary information. The model may not need to proceed to additional data domains if the generated answer data may be determined to be sufficient, thereby reducing the dependence of the model on unverified data and preventing hallucinations that result from conflating different contexts and data sources.

In some examples, generating answer data based on additional data domains may involve evaluating at least one confidence metric or threshold associated with the generated answer data. A confidence metric may correspond to answer data such that the confidence metric may be an evaluation of answer data (e.g., may indicate an amount of model confidence in answer data). Some disclosed embodiments involve one or more confidence metrics, such as different confidence metric corresponding to different answer data (e.g., different answers generated by a machine learning model). System 200, including any machine learning model as described herein, may receive a confidence metric, such as any measure of the accuracy and/or relevancy of the answer data. The confidence metric may also measure or estimate the prevalence of any hallucinated or uncertain answer data. In an example, the confidence metric may be determined by second system 206. In some examples, the confidence metric may be determined based on a user or a user response. The confidence metric may be, may be based on, or may include, a user response received by system 100 such as a user response transmitted through feedback module 120. For example, a user may interact with feedback module 120, including by selecting or pressing icons on a graphical interface, to provide a response corresponding to a measure of confidence (e.g., a slider indicating a percentage). The confidence metric may be evaluated and compared to a certain threshold, such as a predetermined or user-determined threshold for the relevancy of the generated answer data. For example, the confidence metric can be evaluated by system 200, such as by machine learning model 208. The confidence metric may also be evaluated by system 100. In some examples, the threshold may be adjusted, such as to lower the threshold or increase the threshold (e.g., guide the model to generate answer data with increased accuracy confidence and increased confidence that generated answer data has reduced hallucinations). The threshold can be adjusted by a user in some examples (e.g., through feedback module 120), thereby enabling the user to control training or updating of the model. As an example, if the confidence metric does not satisfy or meet the threshold, the model may incrementally utilize additional data domains. For example, if the answer data generated based on a first data domain has a corresponding confidence measurement that does not satisfy a confidence threshold (e.g., the generated answer data may fail to reach a threshold of relevancy or accuracy), the machine learning model may access a second domain and use (e.g., use as training data, use as validation data, use as input data to a trained machine learning model) the second data domain to generate updated answer data. As described herein, the evaluation of whether the confidence metric satisfies or does not satisfy the threshold may be determined by a machine learning model, such as model 206. The updated answer data may be evaluated to determine if the associated confidence metric satisfies the threshold. Similarly, the machine learning model may train and generate answer data based on incrementally included data domains as determined based on evaluations of the confidence metric. As such, it will be appreciated that in some examples, the machine learning model does not necessarily utilize higher data domains unless the generated answer data does not meet the threshold, thereby conserving resources and reducing hallucinations.

Figure 4:
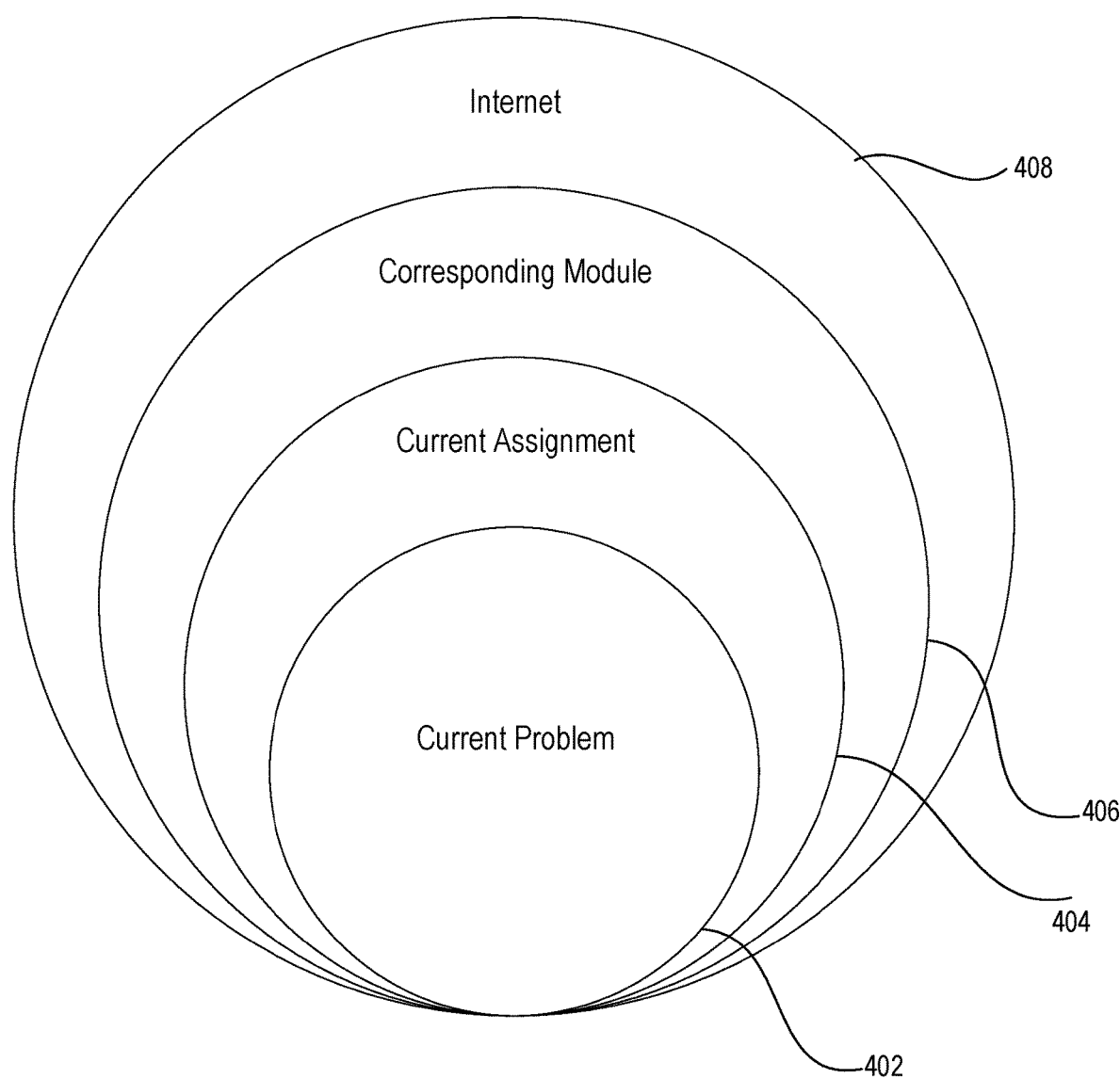
FIG. 4 is an illustration of data domains, consistent with embodiments of the present disclosure.

FIG. 4 illustrates a diagram of a data domains, consistent with embodiments of the present disclosure. Data domains may include different scopes of knowledge for various assignments, exams, or courses. For example, a first data domain 402 may represent a specific problem a student may solving for a class as part of an assignment, such as problem set. First data domain 402 may include a transcript of the assignment, such as a copy of the assignment stored in a database or an optical character recognition copy of an assignment, such that system 100 may receive the transcript in a text format. A second data domain 404 may include the entirety of the assignment and the first domain 402. A third domain 406 may include the corresponding module, such as all the assignments or resources (e.g., recordings, lectures, and textbooks) in the same category as the assignment, as well as the second domain 404. A fourth domain 408 may include any information available on the internet, as well as the third data domain. For example, a machine learning model may generate answer data corresponding to a problem for an assignment or a recording. The machine learning model may generate answer data by providing hints or guidance to a user without presenting the entire answer.

Some disclosed embodiments involve transmitting at least one of the prompt, the text transcript, and the first data domain to a second system. Transmitting may refer to sending, transferring, or providing (e.g., across a network) data or information. For example, the query prompt, text transcript, and the selected first data domain may be transferred to a second system, such as system 206. The second system may include a machine learning model, including large language models, as described herein. Some disclosed embodiments may involve transmitting the identification of a domain. For example, transmitting a data domain may include sending the identification of a data domain (e.g., upon identifying or selecting a data domain, a classification or label of a data domain may be sent to the machine learning model such that the model may understand which data domain to use for training and/or generation of a prediction).

Figure 5:
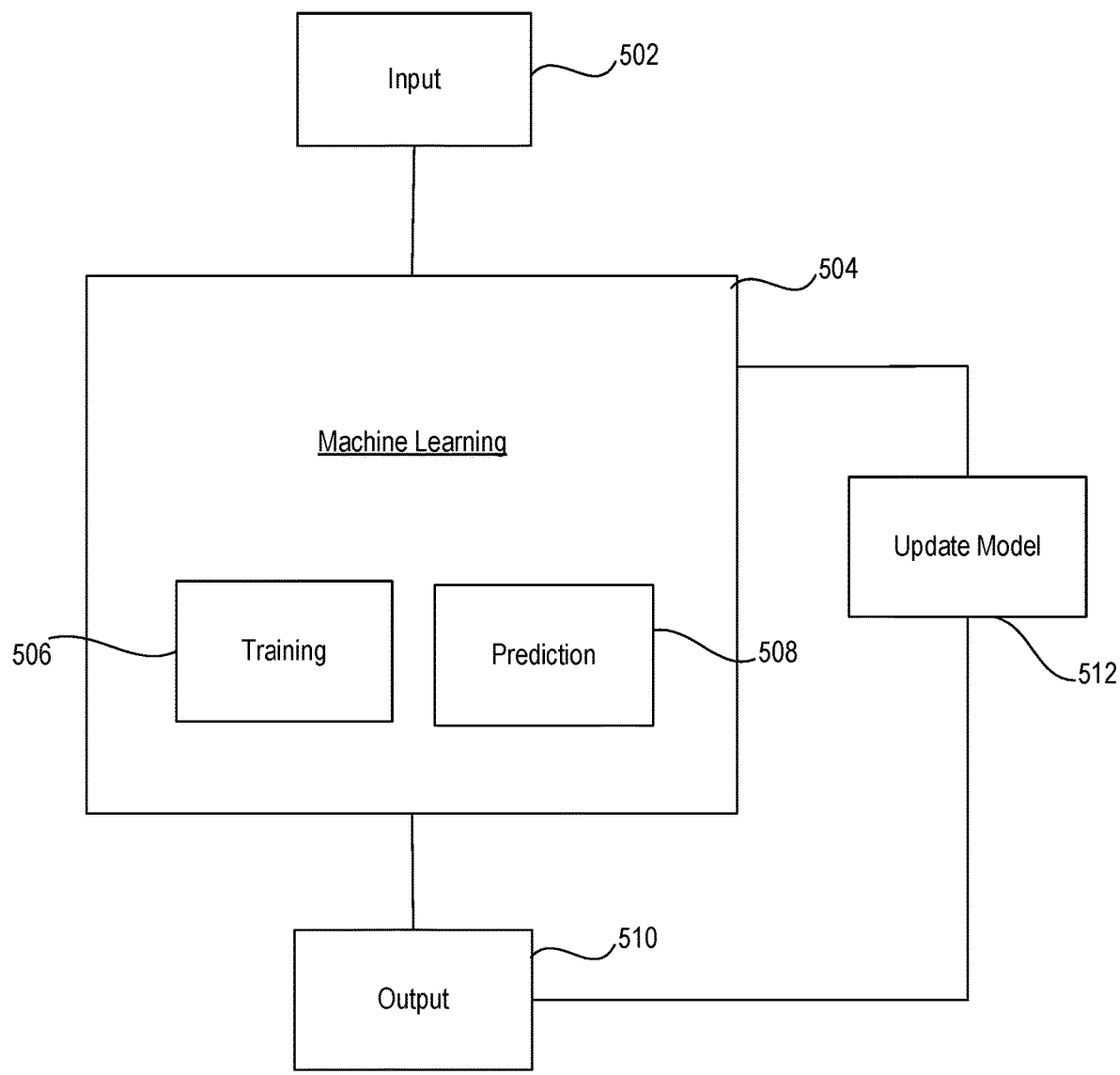
FIG. 5 is a block diagram of training a machine learning model, consistent with embodiments of the present disclosure.

FIG. 5 illustrates a diagram for training and using a machine learning model, consistent with embodiments of the present disclosure. Inputs 502 to machine learning model 504 (e.g., machine learning model included in system 206) may include at least one of the prompt, the text transcript, or a selected data domain. For example, inputs 502 may include the prompt, the text transcript corresponding to a video lecture, and the first data domain. In another example, inputs 502 may include the prompt, the text transcript, and the second data domain. In another example, inputs 502 may include the prompt, the text transcript, and the third data domain. It will be appreciated that inputs 502 may include any selected data domain. Inputs 502 may also include user preferences, user history information, or any contextual digital information. Inputs 502 may be transmitted to machine learning model 504. Performing machine learning may involve training 506 and/or prediction 508. Training 506 (e.g., training a large language model) may include one or more of adjusting parameters (e.g., parameters of the model), removing parameters, adding parameters, generating functions, generating connections (e.g., neural network connecting), or any other machine training operation. In some embodiments, training may involve performing iterative and/or recursive operations to improve model performance.

For example, application 106 may transmit an input 502 of a question and the transcript to machine learning model 504, and the machine learning model may perform a search within the transcript to identify the answer. Machine learning model 504 may also access a timestamp as an input. For example, machine learning model 504 may access the timestamp of a prompt, such as the relative time where a question was received, or the machine learning model 504 can use the question to search the transcript and determine a location in the transcript corresponding to the question. In another example, application 106 may present one or more possible determined locations in the transcript or moments in the recording corresponding to where or when the question was asked, and a user may confirm the location, thereby improving the accuracy of the machine learning model.

In some embodiments, machine learning model 504 may be a large language model which may be publicly accessible. For example, machine learning model 504 may be a LLM accessible to the public, such as machine learning models which have already been trained. In such examples, training 506 may involve providing the inputs 502 to the machine learning model, including providing the text transcript to the machine learning model. Thus, the machine learning may be adapted to include specific, relevant information, such as information contained within the data domains transmitted to the model. For example, training the machine learning model 504 based on the first domain may refer to adjusting parameters in the model based on the first domain. Similarly, machine learning model 504 may be trained with any data domain, such as the second data domain, the third data domain, the fourth data domain, and/or the fifth data domain. It will be appreciated that by providing the transcript and data domain to the machine learning model during training, the model may access more data that may have been previously unfamiliar to the model, thereby expanding model training and improving in the functioning of the model.

In some embodiments, training 506 of machine learning model 504 may refer to providing contextual data for a prompt or query to the machine learning model. For example, transmitting inputs such as a data domain may provide background for a question asked to the machine learning model. As such, training 506 may involve guiding the model towards a certain output by limiting the scope of the model (e.g., limiting model connections, limiting model nodes, limiting model layers). Prediction 508 may refer to generating a prediction with machine learning model 504. Prediction 508 may refer to inference. In an example, prediction 508 may refer to using model 504 to predict the next word in a sequence of words, such as phrase or a sentence.

Machine learning model 504 may be configured to generate one or more outputs 510. Some disclosed embodiments involve generating answer data corresponding to a prompt by querying machine learning model 504 with the prompt. Generating answer data may refer to the machine learning model generating a response to a query. For example, when prompted with a query for a video lecture about biology, machine learning model 504 may generate an answer to the query while using data domains or a text transcript provided to the model such that the answer may be more relevant to the material in the video lecture. In some examples, output 510 may be generated based on information in a data domain provided to the machine learning model. The machine learning model may generate answer data based on one or more data domains, such as determining whether a data domain includes answer data for (e.g., associated with, correlated with, relevant to) a given prompt. For example, the machine learning model may search for an answer to a question in a first data domain, such as a limited portion of a text transcript of a recording, and then output answer data by generating natural language (e.g., a phrase or sequence of words) corresponding to the answer data. For example, a LLM can adjust, enhance, or optimize answer data found in a first domain by altering, rephrasing, or reorganizing the answer data such that the answer data may be presented in a more suitable manner for answering a given prompt. In another example, the machine learning model may generate answer data by searching the entire transcript for answer data, and then organize the answer data to a format which can answer the prompt. For example, the machine learning model may limit the answer data to only answer data found in the transcript (e.g., when asked to limit the data by a user). It will be appreciated that for any data domain, the machine learning model may identify answer data in the data domain and any other data domains included. As such, the machine learning model may be configured to utilize local context (e.g., data from a first data domain) alongside external data (e.g., data from the internet). It will be appreciated that aspects of generating answer data based on data domains and/or a transcript may improve natural-language based machine learning model training and accuracy by reducing the amount of hallucinations produced by generative artificial intelligence, such as LLMs. It will be recognized that hallucination including outputs which may not be real or may not match data or patterns a model has been trained on (e.g., nonsensical or false outputs) can be detrimental to the use of a machine learning model. By providing and training on transcripts and data domains, disclosed embodiments may reduce hallucinations by restricting a machine learning model, thereby enabling the model to generate answer data better corresponding to information within data domains.

It will be appreciated that the disclosed embodiments present technical solutions to the problem of LLM hallucination. For example, LLM hallucination may present the problem of generating irrelevant, inaccurate, or out of context answer data. Further, training or using machine learning models based on data which may include hallucinated information may result in further hallucinations in the models. As an example, It will also be recognized that model hallucination may present significant detriments in the field of education, such as when students utilize LLMs for educational purposes. As the student may be unfamiliar with the topic they are learning about, when they prompt an LLM and receive hallucinated data from the LLM, the students may be likely to trust the hallucinated data, thereby learning wrong information. Thus, LLM hallucination may contribute to the spread of misinformation. For example, an LLM may hallucinate when they encounter a query that was not originally in the scope of the training data. However, by providing specific data domains as described herein, such as a transcript of a video lecture, the LLM may be presented with authentic context and information that it may use to generate answer data. By reducing the amount of irrelevant data for use by an LLM, this also reduces the usage of electronic processing and storage for LLM operation.

Some disclosed embodiments may involve transmitting the answer data, such as transmitting the answer data to a first system. Transmitting the answer data may include communicating the answer data to the first system from the second system. For example, answer data may be communicated by providing the answer data in a natural language format (e.g., text) over a network. The first system may refer to a system different than machine learning model 504. For example, the first system may refer to system 100, as referenced in FIG. 1, and generating outputs 510 may involve presenting the outputs on system 100. For example, answer data may be displayed in a visual format on display 104 and/or transmitted via audio, such as through a speaker (e.g., text-to-speech).

Some embodiments may involve a step 512 of updating the machine learning model. In some examples, updating the machine learning model may involve reconfiguring weights in the model, such as in a neural network model. Updating the machine learning model may involve generating answer data based on different data domains, such as if the machine learning model cannot find answer data for a given prompt in a first data domain, the machine learning model may utilize higher data domains provided to the model, including transmitting data domains through an application. For example, if the machine learning model determines there may not be answer data for a given a question about a video lecture in minutes surrounding the time the question was asked (e.g., a first data domain), the machine learning model may be updated by accessing a second data domain (e.g., the entire transcript), and generating answer data based on the second data domain and the first data domain. In an example, if the machine learning model determines there may not be answer data in the second domain, the model may train on a third data domain, and generate answer data based on the first data domain, the second data domain, and the third data domain.

In some embodiments, updating the machine learning model may involve feedback, such as feedback from a user. For example, system 100 may receive feedback regarding the accuracy of generated answer data, including the relevancy of the answer data to a prompt. For example, system 100 may receive feedback (such as feedback 126) from a user, and the feedback may be transmitted to a second system including a machine learning model. The feedback may involve a determination that the generated answer data was not satisfactory to a user (e.g., based on user input, based on a user reaction), and the feedback may trigger the machine learning model to regenerate the answer data by updating the machine learning model (such as by utilizing information from different data domains). For example, if system 100 receives feedback that a generated answer did not sufficiently address a prompt for a video lecture, the machine learning model may utilize additional data domains to generate updated answer data, and extract information from the additional data domains to improve the updated answer data. Additional data domains may be utilized as necessary depending on iterative feedback. It will be appreciated that in engaging with feedback, the model may learn which data domains contain the information most helpful to answering different questions within different respective contexts, thereby enabling more faster, efficient generation of the relevant answer data as the model predicts which additional data domains to retrieve data from (which may also enable the model to conserve resources as less data may be held in the system's short term memory).

Figure 6:
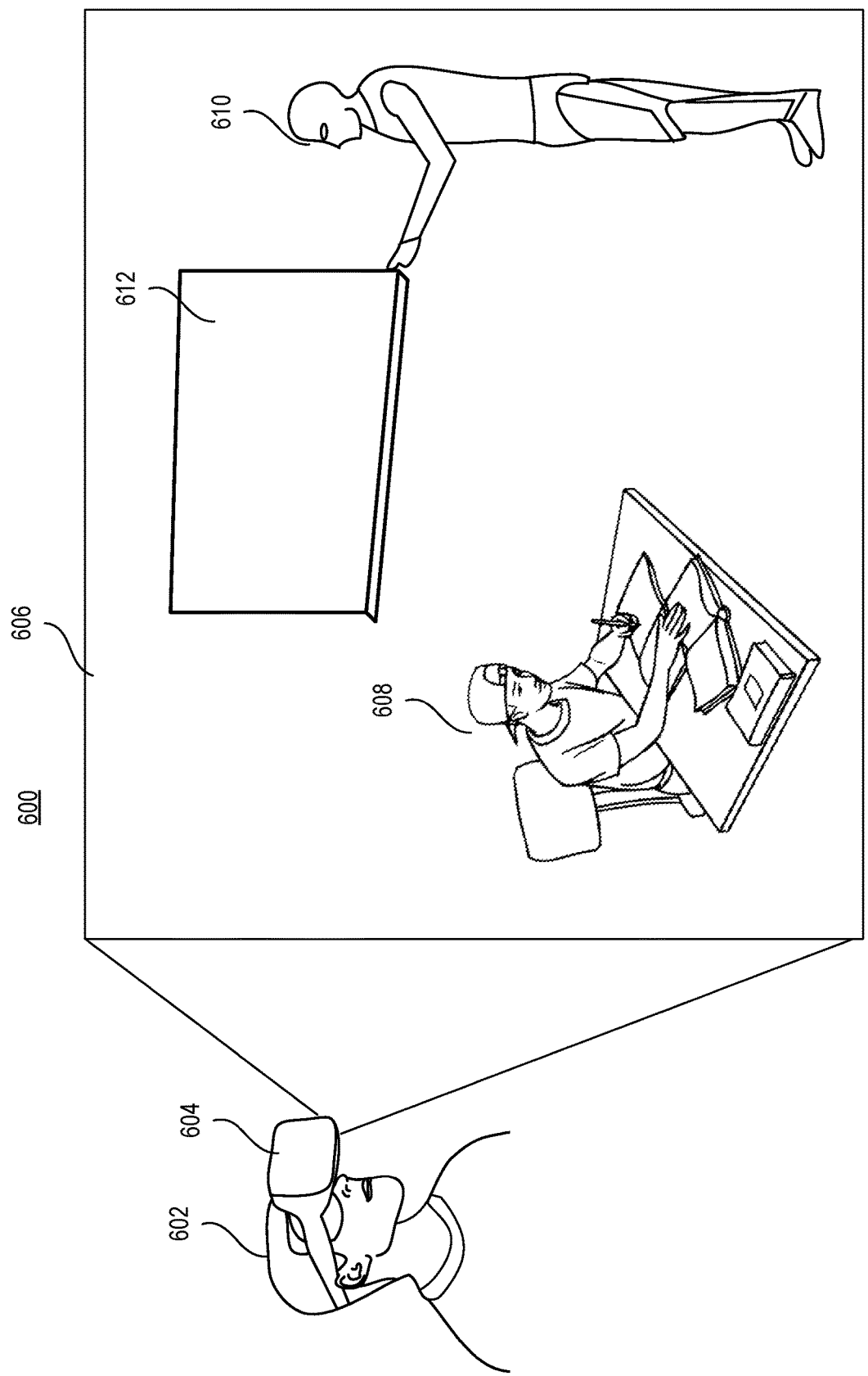
FIG. 6 is an illustration of a virtual reality implementation, consistent with embodiments of the present disclosure.

FIG. 6 illustrates an extended reality implementation, consistent with embodiments of the present disclosure. Extended reality system 600 may involve any computer-mediated reality such as virtual reality, augmented reality, and/or mixed reality (e.g., both virtual reality and augmented reality). For example, virtual reality may include a simulated experience of a virtual environment, and augmented reality may include interactive experiences which can enhance natural environments or situations (such as a combination of the real world and a virtual world). Extended reality system 600 may involve an extended reality device 604 which may be operated or worn by a user 602. For example, extended reality device 604 may include any hardware and/or software for generating and presenting a virtual environment 606. Extended reality device 604 can include a smartphone, computer, tablet, smart eyeglasses, headset, or the like. For example, extended reality device 604 may project and display a virtual environment 606, which can be a computer simulation of a real environment or a computer-rendered environment. In an example, virtual environment 606 may include a location for formal education, such as a classroom. Extended reality system 600 may include a virtual user rendering 608 of user 602 and a virtual character 610. Virtual character 610 may be a simulated representation of a machine learning model, and may be configured as a non-player character (e.g., avatar) or an interface for simulating human interaction, such as a chat-bot. For example, virtual character 610 may receive prompts such as a question from user rendering 608, and virtual character 610 may generate answer data using machine learning models, as described herein. Virtual character 610 may be configured to interact with user rendering 608 through audio (e.g., conversing via speech and hearing), or through the display (e.g., answer data may be presented on virtual display 612). In some examples, extended reality system 600 may be configured for interactions between user rendering 608 and virtual character 610, including interactions where virtual character 610 receives a prompt from user rendering 608, such that extended reality system 600 may select a data domain from a recording in virtual environment 606 to generate answer data corresponding to the prompt. It will be appreciated that extended reality system 600 may enable improved learning for user 602, as the system 600 may emulate a formal education experience based in reality, such as one conducted in a classroom, when such reality-based experience may not exist, such as when a student may be learning from a prerecorded video lecture. In an example, user rendering 608 may represent an educator such as a teacher or a tutor and may include a simulated voice of the educator. Thus, extended reality system 600 may increase the engagement and/or participation of user 602 by emulating a live classroom experience. It will be appreciated that combining an extended reality environment with a machine learning model (e.g., an LLM) and transcript information, for generating predictive output, forms a non-conventional and non-generic arrangement, which contributes to generating real time output for prompt inquires in an engaging manner.

Figure 7:
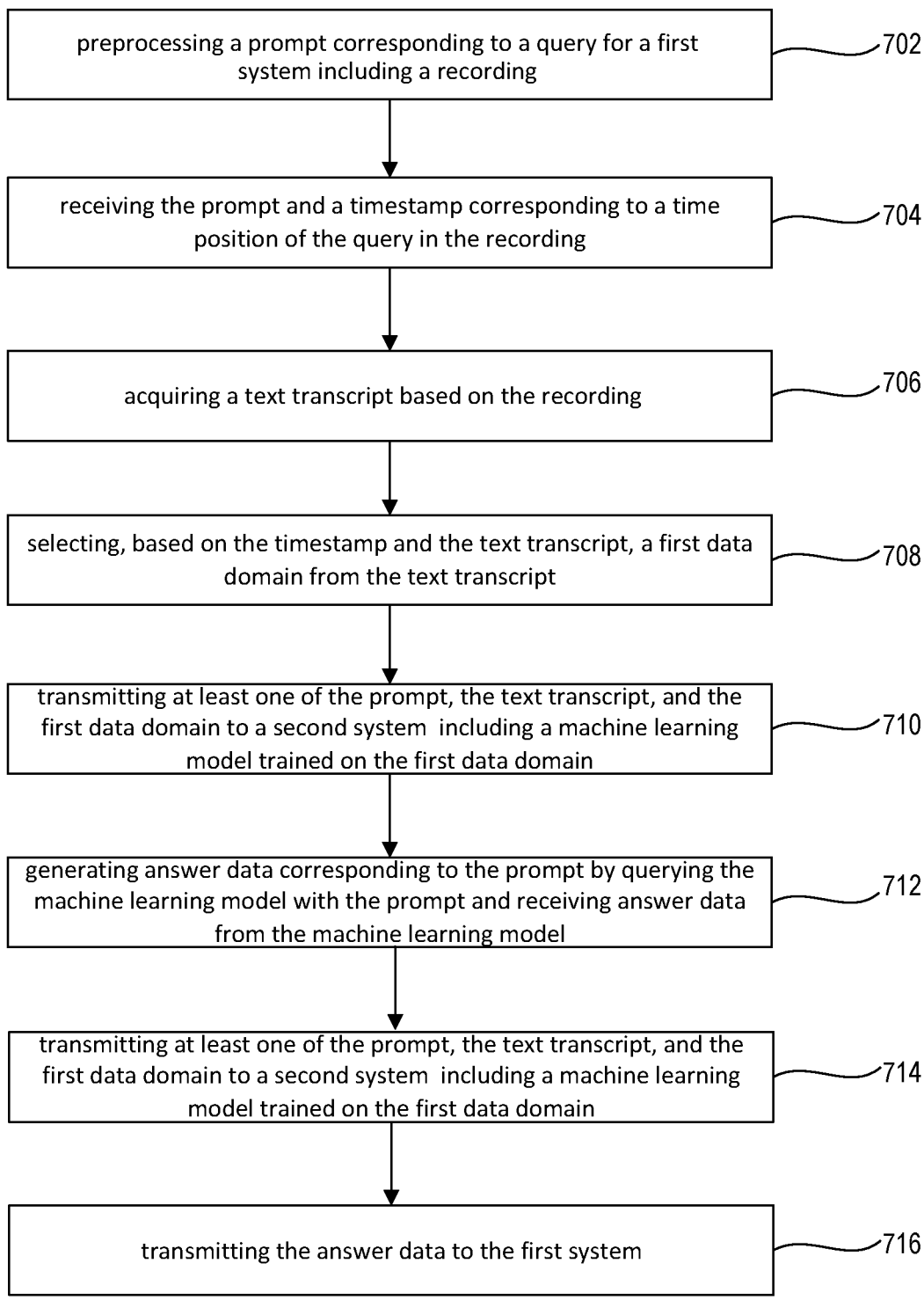
FIG. 7 is a flow diagram of a method, consistent with embodiments of the present disclosure.

FIG. 7 illustrates an exemplary method for prompting a machine learning model to generate answer data based on a recording, consistent with embodiments of the present disclosure. For convenience of description, method 700 may be described herein as being performed by a computer, such as computing device 802. However, the disclosed embodiments are not so limited. In some embodiments, method 700 may be performed by one or more processors, microprocessors, or computing systems. For example, method 700 may be performed by processor 806. Furthermore, the computer(s) used to train the machine learning model may differ or be separate from the computer(s) used to obtain the training data, the computer(s) used to generate the training dataset, or the computer(s) which may use the machine learning model for inference. In some embodiments, method 700 may involve a step 702 of preprocessing a prompt corresponding to a query for a first system including a recording. Some embodiments involve a step 704 of receiving the prompt and a timestamp corresponding to a time position of the query in the recording. Some embodiments include a step 706 of acquiring a text transcript based on the recording. Some embodiments include a step 708 of selecting, based on the timestamp and the text transcript, a first data domain from the text transcript. Some embodiments include a step 710 of transmitting at least one of the prompt, the text transcript, and the first data domain to a second system. The second system may include a machine learning model trained on the first data domain. Some embodiments include a step 712 of generating answer data corresponding to the prompt by querying the machine learning model with the prompt and receiving answer data from the machine learning model. Some embodiments involve a step 714 of transmitting at least one of the prompt, the text transcript, and the first data domain to a second system. Some embodiments involve a step 716 of transmitting the answer data to the first system.

Figure 8:
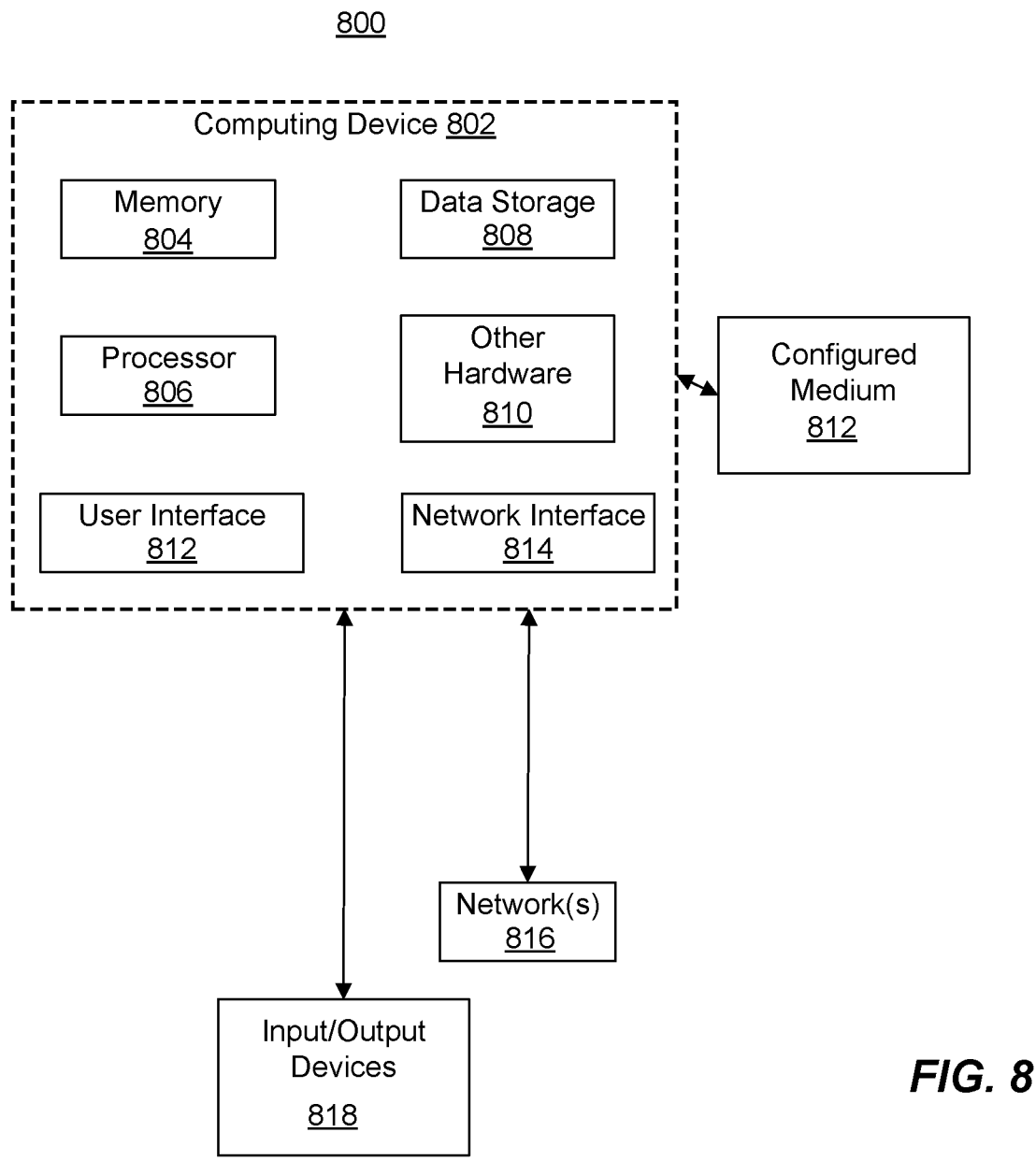
FIG. 8 is a block diagram illustrating an exemplary operating environment for implementing various aspects of this disclosure, according to some embodiments of the present disclosure.

An exemplary operating environment for implementing various aspects of this disclosure is illustrated in FIG. 8. As illustrated in FIG. 8, an exemplary operating environment 800 may include a computing device 802 (e.g., a general-purpose computing device) in the form of a computer (e.g., a system 100). Components of the computing device 802 may include, but are not limited to, various hardware components, such as one or more processors 806, data storage 808, a system memory 804, other hardware 810, and a system bus (not shown) that couples (e.g., communicably couples, physically couples, and/or electrically couples) various system components such that the components may transmit data to and from one another. The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

With further reference to FIG. 8, an operating environment 800 for an exemplary embodiment includes at least one computing device 802. The computing device 802 may be a uniprocessor or multiprocessor computing device. An operating environment 800 may include one or more computing devices (e.g., multiple computing devices 802) in a given computer system, which may be clustered, part of a local area network (LAN), part of a wide area network (WAN), client-server networked, peer-to-peer networked within a cloud, or otherwise communicably linked. A computer system may include an individual machine or a group of cooperating machines. A given computing device 802 may be configured for end-users, e.g., with applications, for administrators, as a server, as a distributed processing node, as a special-purpose processing device, or otherwise configured to train machine learning models and/or use machine learning models.

One or more users may interact with the computer system comprising one or more computing devices 802 by using a display, keyboard, mouse, microphone, touchpad, camera, sensor (e.g., touch sensor) and other input/output devices 818, via typed text, touch, voice, movement, computer vision, gestures, and/or other forms of input/output. For example, with reference to FIG. 1, input/output devices 818 may include display 104, input engine 114, keyboard 118, and/or microphone 116. An input/output device 818 may be removable (e.g., a connectable mouse or keyboard) or may be an integral part of the computing device 802 (e.g., a touchscreen, a built-in microphone). A user interface 812 may support interaction between an embodiment and one or more users. A user interface 812 may include one or more of a command line interface, a graphical user interface (GUI), natural user interface (NUI), voice command interface, and/or other user interface (UI) presentations, which may be presented as distinct options or may be integrated. A user may enter commands and information through a user interface or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other NUI may also be used with the appropriate input devices, such as a microphone, camera, tablet, touch pad, glove, or other sensor. These and other input devices are often connected to the processing units through a user input interface that is coupled to the system bus, but may be connected by other interface and bus structures, such as a parallel port, game port or a universal serial bus (USB). A monitor or other type of display device is also connected to the system bus via an interface, such as a video interface. The monitor may also be integrated with a touch-screen panel or the like. Note that the monitor and/or touch screen panel can be physically coupled to a housing in which the computing device is incorporated, such as in a tablet-type personal computer. In addition, computers such as the computing device may also include other peripheral output devices such as speakers and printer, which may be connected through an output peripheral interface or the like.

One or more application programming interface (API) calls may be made between input/output devices 818 and computing device 802, based on input received from at user interface 812 and/or from network(s) 816. As used throughout, "based on" may refer to being established or founded upon a use of, changed by, influenced by, caused by, or otherwise derived from. In some embodiments, an API call may be configured for a particular API, and may be interpreted and/or translated to an API call configured for a different API. As used herein, an API may refer to a defined (e.g., according to an API specification) interface or connection between computers or between computer programs.

System administrators, network administrators, software developers, engineers, and end-users are each a particular type of user. Automated agents, scripts, playback software, and the like acting on behalf of one or more people may also constitute a user. Storage devices and/or networking devices may be considered peripheral equipment in some embodiments and part of a system comprising one or more computing devices 802 in other embodiments, depending on their detachability from the processor(s) 806. Other computerized devices and/or systems not shown in FIG. 8 may interact in technological ways with computing device 802 or with another system using one or more connections to a network 816 via a network interface 814, which may include network interface equipment, such as a physical network interface controller (NIC) or a virtual network interface (VIF).

Computing device 802 includes at least one logical processor 806. The at least one logical processor 806 may include circuitry and transistors configured to execute instructions from memory (e.g., memory 804). For example, the at least one logical processor 806 may include one or more central processing units (CPUs), arithmetic logic units (ALUs), Floating Point Units (FPUs), and/or Graphics Processing Units (GPUs). The computing device 802, like other suitable devices, also includes one or more computer-readable storage media, which may include, but are not limited to, memory 804 and data storage 808. In some embodiments, memory 804 and data storage 808 may be part a single memory component. The one or more computer-readable storage media may be of different physical types. The media may be volatile memory, non-volatile memory, fixed in place media, removable media, magnetic media, optical media, solid-state media, and/or of other types of physical durable storage media (as opposed to merely a propagated signal). In particular, a configured medium 820 such as a portable (i.e., external) hard drive, compact disc (CD), Digital Versatile Disc (DVD), memory stick, or other removable non-volatile memory medium may become functionally a technological part of the computer system when inserted or otherwise installed with respect to one or more computing devices 802, making its content accessible for interaction with and use by processor(s) 806. The removable configured medium 820 is an example of a computer-readable storage medium. Some other examples of computer-readable storage media include built-in random access memory (RAM), read-only memory (ROM), hard disks, and other memory storage devices which are not readily removable by users (e.g., memory 804).

The configured medium 820 may be configured with instructions (e.g., binary instructions) that are executable by a processor 806; "executable" is used in a broad sense herein to include machine code, interpretable code, bytecode, compiled code, and/or any other code that is configured to run on a machine, including a physical machine or a virtualized computing instance (e.g., a virtual machine or a container). The configured medium 820 may also be configured with data which is created by, modified by, referenced by, and/or otherwise used for technical effect by execution of the instructions. The instructions and the data may configure the memory or other storage medium in which they reside; such that when that memory or other computer-readable storage medium is a functional part of a given computing device, the instructions and data may also configure that computing device.

Although an embodiment may be described as being implemented as software instructions executed by one or more processors in a computing device (e.g., general-purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include other hardware logic components 810 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processor(s) 806, memory 804, data storage 808, and screens/displays, an operating environment may also include other hardware 810, such as batteries, buses, power supplies, wired and wireless network interface cards, for instance. The nouns "screen" and "display" are used interchangeably herein. A display may include one or more touch screens, screens responsive to input from a pen or tablet, or screens which operate solely for output. In some embodiment, other input/output devices 818 such as human user input/output devices (screen, keyboard, mouse, tablet, microphone, speaker, motion sensor, etc.) will be present in operable communication with one or more processors 806 and memory.

In some embodiments, the system includes multiple computing devices 802 connected by network(s) 816. Networking interface equipment can provide access to network(s) 816, using components (which may be part of a network interface 814) such as a packet-switched network interface card, a wireless transceiver, or a telephone network interface, for example, which may be present in a given computer system. However, an embodiment may also communicate technical data and/or technical instructions through direct memory access, removable non-volatile media, or other information storage-retrieval and/or transmission approaches.

The computing device 802 may operate in a networked or cloud-computing environment using logical connections to one or more remote devices (e.g., using network(s) 816), such as a remote computer (e.g., another computing device 802). The remote computer may include one or more of a personal computer, a server, a router, a network PC, or a peer device or other common network node, and may include any or all of the elements described above relative to the computer. The logical connections may include one or more LANs, WANs, and/or the Internet.

When used in a networked or cloud-computing environment, computing device 802 may be connected to a public or private network through a network interface or adapter. In some embodiments, a modem or other communication connection device may be used for establishing communications over the network. The modem, which may be internal or external, may be connected to the system bus via a network interface or other appropriate mechanism. A wireless networking component such as one comprising an interface and antenna may be coupled through a suitable device such as an access point or peer computer to a network. In a networked environment, program modules depicted relative to the computer, or portions thereof, may be stored in the remote memory storage device. It may be appreciated that the network connections shown are exemplary and other means of establishing a communications link between the computers may be used.

Computing device 802 typically may include any of a variety of computer-readable media. Computer-readable media may be any available media that can be accessed by the computer and includes both volatile and nonvolatile media, and removable and non-removable media, but excludes propagated signals. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, electrically erasable programmable read-only memory (EEPROM), flash memory or other memory technology, CD-ROM, DVD or other optical disk storage, magnetic cassettes, magnetic tape, magnetic disk storage or other magnetic storage devices, or any other medium which can be used to store the desired information (e.g., program modules, data for a machine learning model, and/or a machine learning model itself) and which can be accessed by the computer. Communication media may embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of the any of the above may also be included within the scope of computer-readable media. Computer-readable media may be embodied as a computer program product, such as software (e.g., including program modules) stored on non-transitory computer-readable storage media.

The data storage 808 or system memory includes computer storage media in the form of volatile and/or nonvolatile memory such as ROM and RAM. A basic input/output system (BIOS), containing the basic routines that help to transfer information between elements within computer, such as during start-up, may be stored in ROM. RAM may contain data and/or program modules that are immediately accessible to and/or presently being operated on by processing unit. By way of example, and not limitation, data storage holds an operating system, application programs, and other program modules and program data.

Data storage 808 may also include other removable/non-removable, volatile/nonvolatile computer storage media. By way of example only, data storage may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

Exemplary disclosed embodiments include systems, methods, and computer-readable media for the generation of text and/or code embeddings. For example, in some embodiments, and as illustrated in FIG. 8, an operating environment 800 may include at least one computing device 802, the at least one computing device 802 including at least one processor 806, at least one memory 804, at least one data storage 808, and/or any other component discussed above with respect to FIG. 9.

Figure 9:
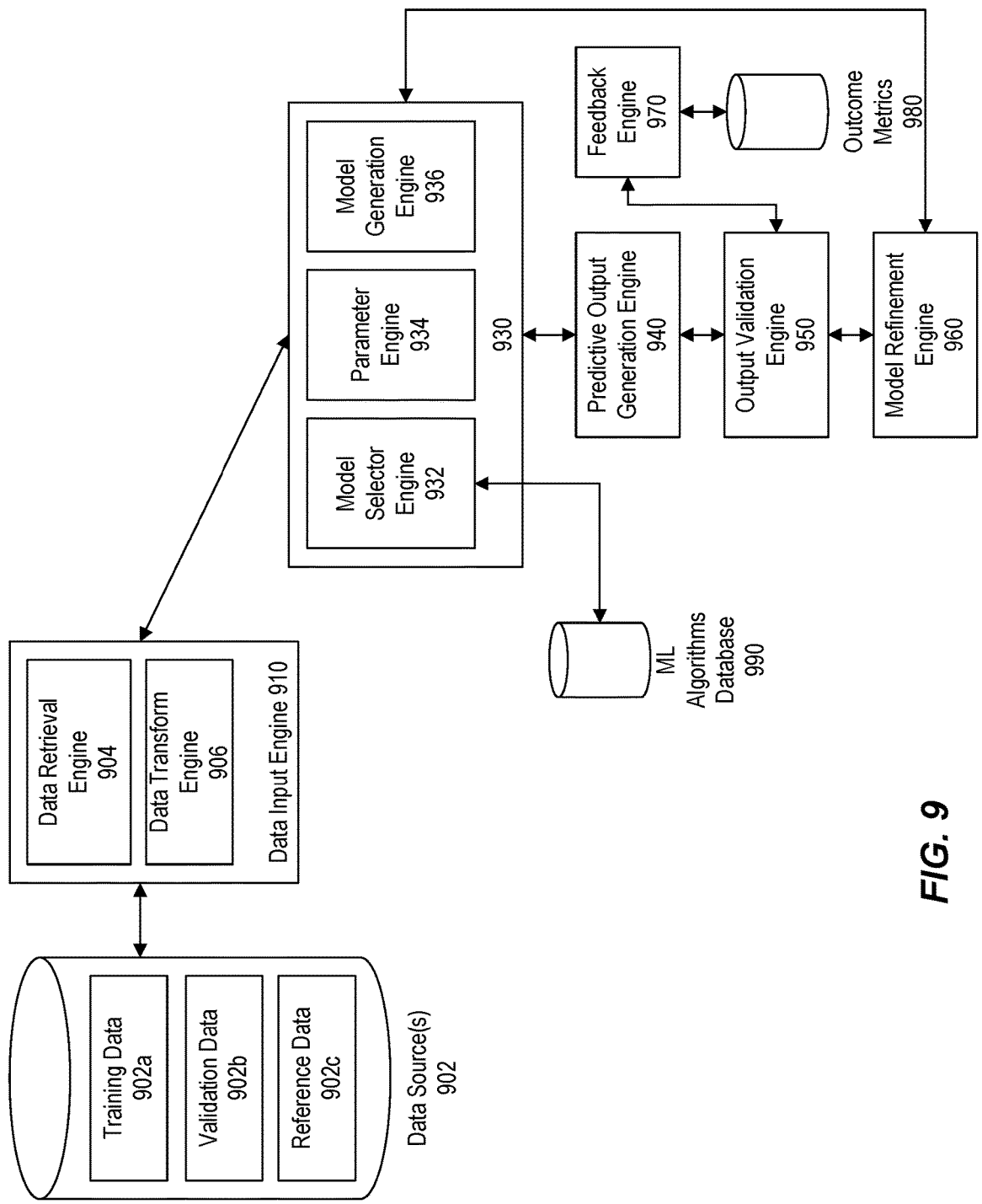
FIG. 9 is a block diagram illustrating an exemplary machine learning platform for implementing various aspects of this disclosure, according to some embodiments of the present disclosure.

FIG. 9 is a block diagram illustrating an exemplary machine learning platform for implementing various aspects of this disclosure, according to some embodiments of the present disclosure.

System 900 may include data input engine 910 that can further include data retrieval engine 904 and data transform engine 906. Data retrieval engine 904 may be configured to access, access, interpret, request, or receive data, which may be adjusted, reformatted, or changed (e.g., to be interpretable by other engine, such as data input engine 910). For example, data retrieval engine 904 may request data from a remote source using an API. Data Input engine 910 may be configured to access, interpret, request, format, re-format, or receive input data from data source(s) 902. For example, data input engine 910 may be configured to use data transform engine 906 to execute a re-configuration or other change to data, such as a data dimension reduction. Data source(s) 902 may exist at one or more memories 804 and/or data storages 808. In some embodiments, data source(s) 902 may be associated with a single entity (e.g., organization) or with multiple entities. Data source(s) 902 may include one or more of training data 902a (e.g., input data to feed a machine learning model as part of one or more training processes), validation data 902b (e.g., data against which at least one processor may compare model output with, such as to determine model output quality), and/or reference data 902c. For example, training data 902a, validation data 902b, and/or reference data 902c may include data domains, as described herein. In some embodiments, data input engine 910 can be implemented using at least one computing device (e.g., computing device 802). For example, data from data sources 902 can be obtained through one or more I/O devices and/or network interfaces. Further, the data may be stored (e.g., during execution of one or more operations) in a suitable storage or system memory. Data input engine 910 may also be configured to interact with data storage 808, which may be implemented on a computing device that stores data in storage or system memory. System 900 may also include machine learning (ML) modeling engine 930, which may be configured to execute one or more operations on a machine learning model (e.g., model training, model re-configuration, model validation, model testing), such as those described in the processes described herein. In an example, machine learning modeling engine 930 may include machine learning model 504, as referenced in FIG. 5. For example, ML modeling engine 930 may execute an operation to train a machine learning model, such as adding, removing, or modifying a model parameter. Training of a machine learning model may be supervised, semi-supervised, or unsupervised. In some embodiments, training of a machine learning model may include multiple epochs, or passes of data (e.g., training data 902a) through a machine learning model process (e.g., a training process). In some embodiments, different epochs may have different degrees of supervision (e.g., supervised, semi-supervised, or unsupervised). Data into to a model to train the model may include input data (e.g., as described above) and/or data previously output from a model (e.g., forming recursive learning feedback). A model parameter may include one or more of a seed value, a model node, a model layer, an algorithm, a function, a model connection (e.g., between other model parameters or between models), a model constraint, or any other digital component influencing the output of a model. A model connection may include or represent a relationship between model parameters and/or models, which may be dependent or interdependent, hierarchical, and/or static or dynamic. The combination and configuration of the model parameters and relationships between model parameters discussed herein are cognitively infeasible for the human mind to maintain or use. Without limiting the disclosed embodiments in any way, a machine learning model may include millions, trillions, or even billions of model parameters. ML modeling engine 930 may include model selector engine 932 (e.g., configured to select a model from among a plurality of models, such as based on input data), parameter selector engine 934 (e.g., configured to add, remove, and/or change one or more parameters of a model), and/or model generation engine 936 (e.g., configured to generate one or more machine learning models, such as according to model input data, model output data, comparison data, and/or validation data). ML algorithms database 990 (or other data storage 808) may store one or more machine learning models, any of which may be fully trained, partially trained, or untrained. A machine learning model may be or include, without limitation, one or more of (e.g., such as in the case of a metamodel) a statistical model, an algorithm, a neural network (NN), a convolutional neural network (CNN), a generative neural network (GNN), a Word2Vec model, a bag of words model, a term frequency-inverse document frequency (tf-idf) model, a GPT (Generative Pre-trained Transformer) model (or other autoregressive model), a Proximal Policy Optimization (PPO) model, a nearest neighbor model (e.g., k nearest neighbor model), a linear regression model, a k-means clustering model, a Q-Learning model, a Temporal Difference (TD) model, a Deep Adversarial Network model, or any other type of model described further herein.

System 900 can further include predictive output generation engine 940, output validation engine 950 (e.g., configured to apply validation data to machine learning model output), feedback engine 970 (e.g., configured to apply feedback from a user and/or machine to a model), and model refinement engine 960 (e.g., configured to update or re-configure a model). In some embodiments, feedback engine 970 may receive input and/or transmit output (e.g., output from a trained, partially trained, or untrained model) to outcome metrics database 980. Outcome metrics database 980 may be configured to store output from one or more models, and may also be configured to associate output with one or more models. In some embodiments, outcome metrics database 980, or other device (e.g., model refinement engine 960 or feedback engine 970) may be configured to correlate output, detect trends in output data, and/or infer a change to input or model parameters to cause a particular model output or type of model output. In some embodiments, model refinement engine 960 may receive output from predictive output generation engine 940 or output validation engine 950. In some embodiments, model refinement engine 960 may transmit the received output to ML modelling engine 930 in one or more iterative cycles.

Any or each engine of system 900 may be a module (e.g., a program module), which may be a packaged functional hardware unit designed for use with other components or a part of a program that performs a particular function (e.g., of related functions). Any or each of these modules may be implemented using a computing device. In some embodiments, the functionality of system 900 may be split across multiple computing devices to allow for distributed processing of the data, which may improve output speed and reduce computational load on individual devices. In some embodiments, system 900 may use load-balancing to maintain stable resource load (e.g., processing load, memory load, or bandwidth load) across multiple computing devices and to reduce the risk of a computing device or connection becoming overloaded. In these or other embodiments, the different components may communicate over one or more I/O devices and/or network interfaces.

System 900 can be related to different domains or fields of use. Descriptions of embodiments related to specific domains, such as natural language processing or language modeling, is not intended to limit the disclosed embodiments to those specific domains, and embodiments consistent with the present disclosure can apply to any domain that utilizes predictive modeling based on available data.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Example embodiments are described above with reference to flowchart illustrations or block diagrams of methods, apparatus (systems) and computer program products. It will be understood that each block of the flowchart illustrations or block diagrams, and combinations of blocks in the flowchart illustrations or block diagrams, can be implemented by computer program product or instructions on a computer program product. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct one or more hardware processors of a computer, other programmable data processing apparatus, or other devices to function in a particular manner, such that the instructions stored in the computer-readable medium form an article of manufacture including instructions that implement the function/act specified in the flowchart or block diagram block or blocks.

The computer program instructions may also be loaded onto a computer, other programmable data processing apparatus, or other devices to cause a series of operational steps to be performed (e.g., executed) on the computer, other programmable apparatus or other devices to produce a computer implemented process such that the instructions that execute on the computer or other programmable apparatus provide processes for implementing the functions/acts specified in the flowchart or block diagram block or blocks.

Any combination of one or more computer-readable medium(s) may be utilized. The computer-readable medium may be a non-transitory computer-readable storage medium. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber cable, RF, IR, etc., or any suitable combination of the foregoing.

Computer program code for carrying out operations, for example, embodiments may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

The flowchart and block diagrams in the figures illustrate examples of the architecture, functionality, and operation of possible implementations of systems, methods, and computer program products according to various embodiments. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described embodiments are not mutually exclusive, and elements, components, materials, or steps described in connection with one example embodiment may be combined with, or eliminated from, other embodiments in suitable ways to accomplish desired design objectives.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A method for prompting a machine learning model to generate answer data based on a recording, the method comprising:

preprocessing a prompt corresponding to a query for a first system, the first system including a recording, by:
receiving the prompt and a timestamp corresponding to a time position in the recording based on when the query is initiated;
acquiring a text transcript based on the recording; and
receiving, based on the timestamp and the text transcript, a first data domain;
transmitting the prompt, the text transcript, and the first data domain to a second system, the second system including the machine learning model trained with the first data domain;
receiving answer data from the machine learning model, wherein the answer data is generated by variably weighing information in the text transcript according to the time position of the timestamp, by weighing information in the text transcript that is in closer proximity to the position of the timestamp higher than information that is more distant from the position of the timestamp;
based on a determination that a confidence metric corresponding to the answer data does not satisfy a threshold, causing the second system to:
access a second data domain, different from the first data domain, and
receive at least a portion of the second data domain at the second system to be used by the machine learning model to generate updated answer data; and
receiving, from the machine learning model, the updated answer data based on the second data domain.

2. The method of claim 1, further comprising implementing an application in the first system, the application being configured to present a user interface at a display.

3. The method of claim 2, further comprising receiving the prompt by:
interacting with a button on the user interface, wherein the interacting pauses the recording; and
receiving the prompt by at least one of an audio input or a text input.

4. The method of claim 1, further comprising:
receiving, from the text transcript, the second data domain;
transmitting the second data domain to the second system;
training the machine learning model with the second data domain; and
generating the updated answer data corresponding to the prompt based on the first data domain and the second data domain.

5. The method of claim 4, further comprising:
retrieving, from a database, data corresponding to a third data domain;
transmitting the data corresponding the third data domain to the second system,
training the machine learning model with the third data domain; and
generating updated answer data corresponding to the prompt based on the first data domain, the second data domain, and the third data domain.

6. The method of claim 1, further comprising:
training the machine learning model with the second data domain; and
generating the updated answer data based on the second data domain.

7. The method of claim 6, wherein the confidence metric is based on a user response received by the first system.

8. The method of claim 1, wherein the machine learning model comprises a large language model trained with an internet dataset.

9. The method of claim 1, wherein the recording is associated with a prerecorded video lecture.

10. A system comprising:
at least one memory storing instructions;
at least one processor configured to execute the instructions to perform operations for prompting a machine learning model to generate answer data based on a recording, the operations comprising:
preprocessing a prompt corresponding to a query for a first system, the first system including a recording, by:
receiving the prompt and a timestamp corresponding to a time position in the recording based on when the query is initiated;
acquiring a text transcript based on the recording; and
receiving, based on the timestamp and the text transcript, a first data domain;
transmitting the prompt, the text transcript, and the first data domain to a second system, the second system including the machine learning model trained with the first data domain;
receiving answer data from the machine learning model, wherein the answer data is generated by variably weighing information in the text transcript according to the time position of the timestamp, by weighing information in the text transcript that is in closer proximity to the position of the timestamp higher than information that is more distant from the position of the timestamp;
based on a determination that a confidence metric corresponding to the answer data does not satisfy a threshold, causing the second system to:
access a second data domain, different from the first data domain, and
receive at least a portion of the second data domain at the second system to be used by the machine learning model to generate updated answer data; and
receiving, from the machine learning model, the updated answer data based on the second data domain.

11. The system of claim 10, further comprising implementing an application in the first system, the application being configured to present a user interface at a display.

12. The system of claim 11, further comprising receiving the prompt by:
interacting with a button on the user interface, wherein the interacting pauses the recording; and
receiving the prompt by at least one of an audio input or a text input.

13. The system of claim 10, further comprising:
receiving from the text transcript, the second data domain;
transmitting the second data domain to the second system;
training the machine learning model with the second data domain; and
generating the updated answer data corresponding to the prompt based on the first data domain and the second data domain.

14. The system of claim 13, further comprising:
retrieving from a database, data corresponding to a third data domain;
transmitting the data corresponding the third data domain to the second system,
training the machine learning model with the third data domain; and generating third answer data corresponding to the prompt based on the first data domain, the second data domain, and the third data domain.

15. The system of claim 10, further comprising:
training the machine learning model with the second data domain; and
generating answer data based on the second data domain.

16. The system of claim 15, wherein the confidence metric is based on a user response received by the first system.

17. The system of claim 10, wherein the machine learning model comprises a large language model trained with an internet dataset.

18. The system of claim 10, wherein the recording is associated with a prerecorded video lecture.

19. A non-transitory computer-readable medium including instructions that are executable by one or more processors to perform operations comprising:
preprocessing a prompt corresponding to a query for a first system, the first system including a recording, by:
receiving the prompt and a timestamp corresponding to a time position in the recording based on when the query is initiated;
acquiring a text transcript based on the recording; and
receiving, based on the timestamp and the text transcript, a first data domain;
transmitting the prompt, the text transcript, and the first data domain to a second system, the second system including a machine learning model trained with the first data domain;
receiving answer data from the machine learning model, wherein the answer data is generated by variably weighing information in the text transcript according to the time position of the timestamp, by weighing information in the text transcript that is in closer proximity to the position of the timestamp higher than information that is more distant from the position of the timestamp;
based on a determination that a confidence metric corresponding to the answer data does not satisfy a threshold, causing the second system to:
access a second data domain, different from the first data domain, and
receive at least a portion of the second data domain at the second system to be used by the machine learning model to generate updated answer data; and
receiving, from the machine learning model, the updated answer data based on the second data domain.

20. The non-transitory computer-readable computer readable medium of claim 19, wherein the machine learning model comprises a large language model trained with an internet dataset.

21. The method of claim 1, further comprising:
generating an extended reality environment;
receiving the first data domain from the extended reality environment; and
transmitting the answer data to be provided within the extended reality environment.

22. The method of claim 1, wherein the second data domain is inclusive of the first data domain and larger than the first data domain.

23. The method of claim 1, wherein the machine learning model comprises a generative artificial intelligence model and the answer data received from the machine learning model comprises natural language data.

24. The method of claim 1, further comprising transmitting, to the second system, information associated with a frame of the recording based on the timestamp.

\* \* \* \* \*